United States Patent [19]

Schmidt, Jr.

[11] 4,391,709
[45] Jul. 5, 1983

[54] FILTER CAKE CONTROL METHOD AND APPARATUS

[75] Inventor: Henry Schmidt, Jr., Hinsdale, Ill.

[73] Assignee: Industrial Filter & Pump Mfg. Co., Cicero, Ill.

[21] Appl No.: 257,895

[22] Filed: Apr. 27, 1981

Related U.S. Application Data

[63] Continuation of Ser. No. 113,618, Jan. 21, 1980, abandoned.

[51] Int. Cl.³ .............................................. B01D 29/12
[52] U.S. Cl. .................................... 210/332; 210/346; 210/351
[58] Field of Search ............... 210/332, 334, 346, 350, 210/351

[56] References Cited

U.S. PATENT DOCUMENTS

| | | | |
|---|---|---|---|
| 1,710,758 | 4/1929 | Wright | 210/486 X |
| 2,547,205 | 4/1951 | Hallander | 210/346 |
| 3,708,072 | 1/1973 | Schmidt, Jr. | 210/350 |
| 3,753,498 | 8/1973 | Gwilliam | 210/350 |
| 3,754,659 | 8/1973 | Kaynski | 210/346 |

*Primary Examiner*—John Adee
*Attorney, Agent, or Firm*—Edmond T. Patnaude

[57] ABSTRACT

Cake control members are mounted at the peripheries of filter leaves and filter tubes to confine the build-up of filter cakes and prevent the cakes from extending over the peripheries of the elements.

10 Claims, 7 Drawing Figures

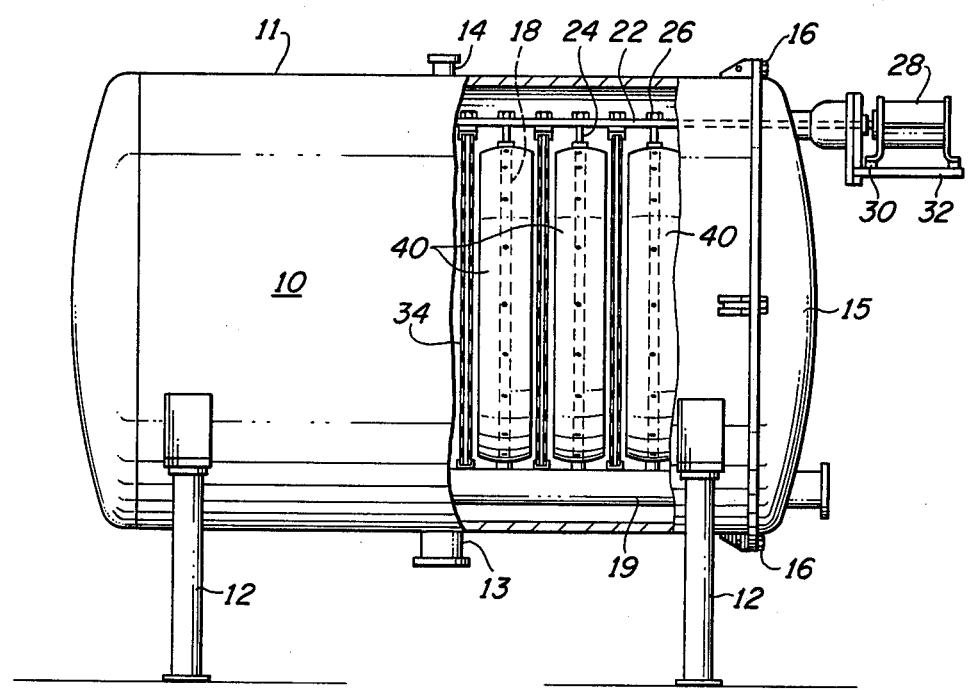
FIG. 1
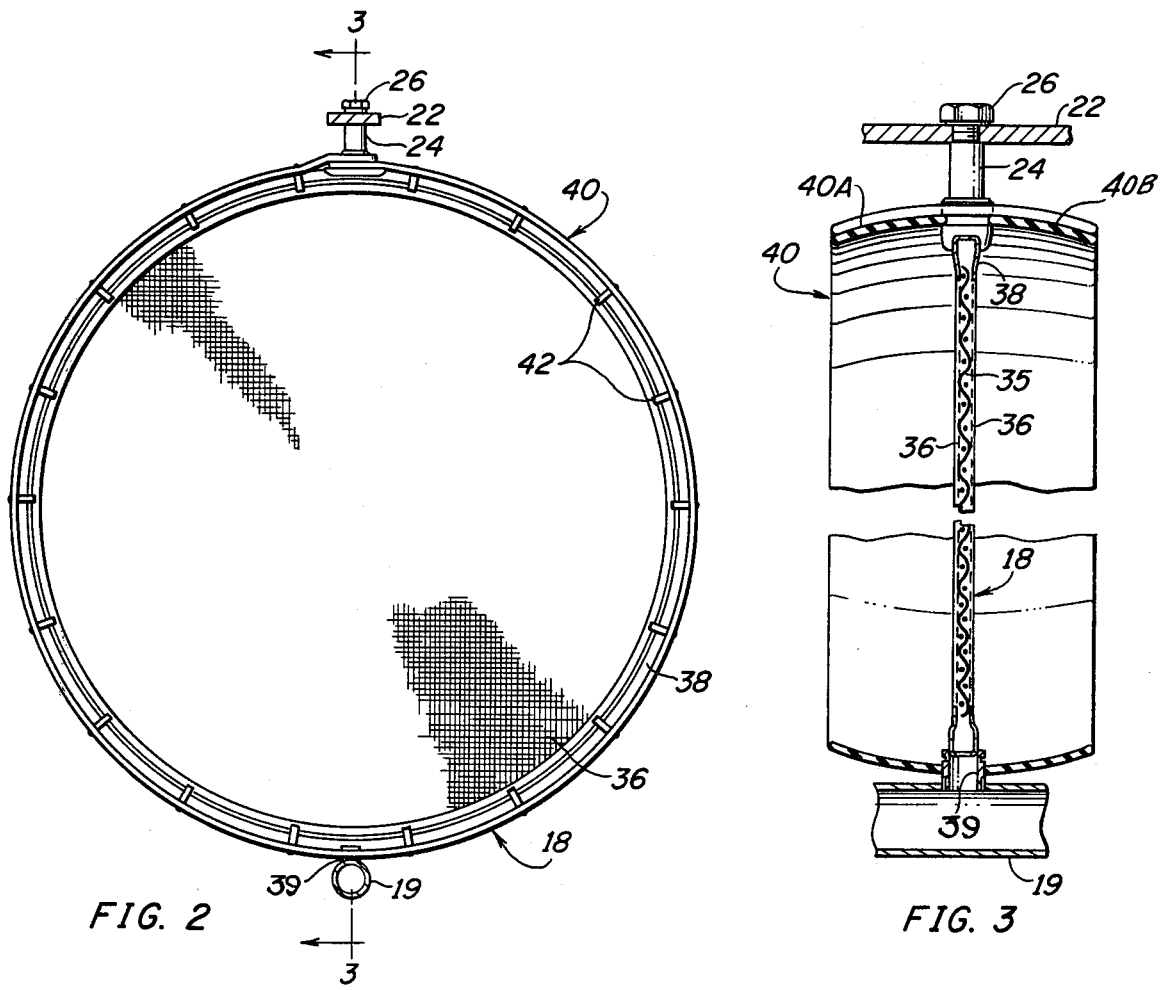
FIG. 2
FIG. 3

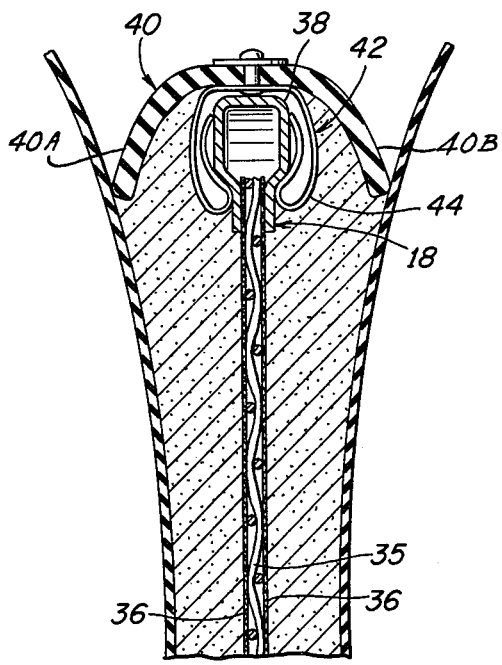
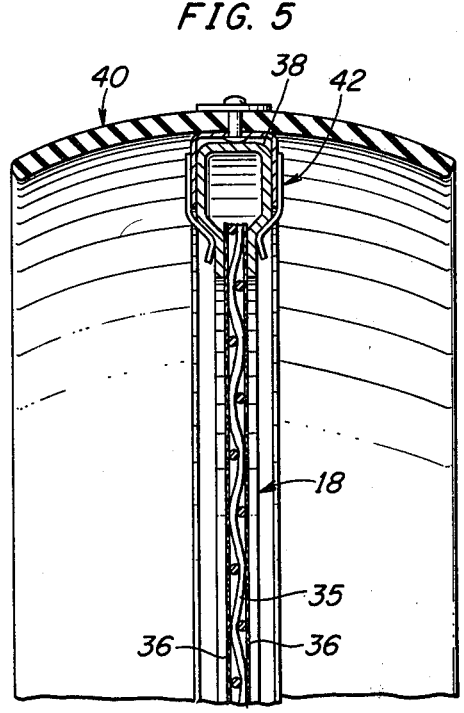
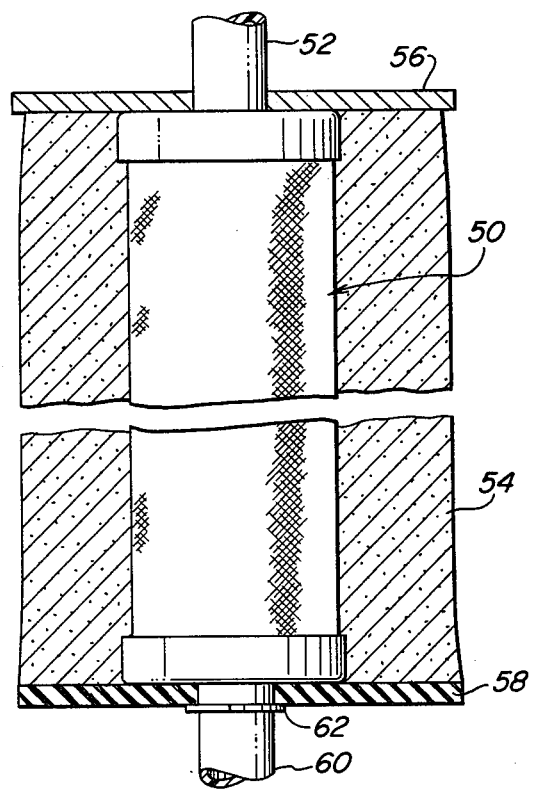
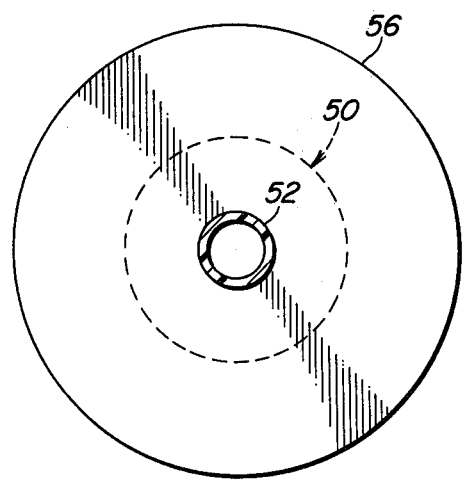

FILTER CAKE CONTROL METHOD AND APPARATUS

This is a continuation of application Ser. No. 06/113,618, filed Jan. 21, 1980 abandoned.

The present invention relates in general to pressure filters having a pressure chamber in which are mounted one or more perforate filter elements through which a liquid to be filtered is passed to deposit solids entrained in the liquid on the external surfaces of each filter element in the form of a porous filter cake. The invention relates more particularly to a novel method and apparatus for preventing the filter cakes from building up beyond the peripheries and over the upper ends of the filter elements.

BACKGROUND OF THE INVENTION

There are two basic types of filter elements used in pressure filters, one being a filter leaf as described, for example, in U.S. Pat. No. 3,212,643 and the other being a filter tube as described, for example, in the U.S. Pat. No. 3,233,739. In a typical filter leaf construction a pair of planar perforate members are mounted in parallel relationship on opposite sides of an underdrain disposed within an imperforate rigid support frame. In a typical filter tube construction a cylindrical perforate member surrounds an underdrain between top and bottom imperforate end caps. As the filtrate to be filtered flows into either of these types of filter elements through the perforate surfaces thereof, entrained solids are deposited over the perforations in the external surfaces, which surfaces may be covered by a perforate filter media, and gradually build up to form filter cakes. When the filter cakes have built up to a thickness where the efficiency of the filter is impaired, the filter is removed from the processing line, and the filter cakes are removed from the filter elements.

While the filter cakes can be removed in various ways, for most applications it is desirable to partially dewater the cakes before they are removed from the filter elements. If, however, the filter cakes have built up over the peripheral surfaces of the filter elements, it is difficult if not impossible to remove the water from the peripheral portions of the cakes. Where the moisture content of the cakes on the filter leaves is reduced by means of compression diaphragms of the type disclosed, for example, in U.S. Pat. Nos. 3,708,072 and 3,814,257, the edges of the diaphragms sometimes become embedded in the soft peripheral portions of the cakes which results in cake transfer to the diaphragms when the diaphragms are subsequently retracted away from the leaves. This problem can be particularly acute in the filtration of highly compressible materials such as organic sewage sludge where a peripheral cake may quickly build up after the diaphragm contacts the face of the cake. There are several other adverse effects which result from peripheral cake buildup, and they include increased moisture content of the removed cake, incomplete cake removal, failure of textile filter media, long down-times, and in some cases, improper operation of automatic control equipment.

Attempts at solving the problem of peripheral cake buildup have included such things as sealing off an upper peripheral portion of the filter media, and reducing the size of the filter element. Although neither method has resolved the problem, they both reduce the effective capacity of the filter. Sluicing systems for removing the soft peripheral portion of the cake while the cake is held in compression by a diaphragm have also been used. U.S. Pat. No. 4,064,045 provides a detailed description of one such system.

SUMMARY OF THE INVENTION

Briefly, there is provided in accordance with the present invention a new and improved method and apparatus for preventing the buildup of a filter cake over the peripheral surfaces of a filter element. In its general aspects, the invention provides an imperforate flange which extends laterally from the filter element adjacent the perforate filter media.

When used on a filter leaf, the flange may extend outwardly from only the upper half of the leaf and have a circumferential length of about 180° or less inasmuch as the peripheral cake which may tend to build up on the lower half of the leaf ordinarily sluffs off when the filter is drained prior to cake removal. Where, however, it is important that the cake remain intact on the leaf after dewatering, the flange should extend completely around the cake.

When the invention is used in combination with a cake compression diaphragm, the flange is preferably formed of a flexible elastomeric material, such as rubber, and is so constructed as to be folded inwardly over the upper edge of the cake by the diaphragm as the diaphragm moves toward the leaf during the cake compression operation. In combination with compression diaphragms the present invention not only prevents the cake from building up over the periphery of the leaf during the filtering operation, but it provides a more uniformly dried cake because it prevents the peripheral portion of the cake from being squeezed out from between the leaf and the diaphragm during the compression operation.

GENERAL DESCRIPTION OF THE DRAWING

The present invention will be better understood by a reading of the following detailed description taken in connection with the accompanying drawing wherein:

FIG. 1 is an elevational view, partly broken away, of a horizontal, pressure leaf filter embodying the present invention;

FIG. 2 is a front elevational view of a filter leaf embodying the present invention;

FIG. 3 is a cross-sectional view taken along the line 3—3 in FIG. 2;

FIG. 4 is a pictorial illustration useful to an understanding of the invention;

FIG. 5 is a fragmentary, cross-sectional view of another embodiment of the present invention;

FIG. 6 is a partially sectioned, plan view of still another embodiment of the invention; and FIG. 7 is a top view of the filter element shown in FIG. 6.

DETAILED DESCRIPTION OF THE INVENTION

Referring particularly to FIG. 1, a horizontal pressure leaf filter is generally identified by the reference character 10 and includes a sealable, generally cylindrical tank 11 mounted on a plurality of legs 12. A drain outlet 13 is located at the bottom and an inlet 14 is located at the top. A cover 15 is removably fitted over the right-hand open end of the tank 11 and is adapted to be sealably connected to the tank by means of a plurality of swing bolts 16.

A plurality of filter leaves 18 are mounted in face-to-face relationship on an outlet manifold 19 and held in place by a rigid bar 22 which extends in a horizontal direction across the tops of the filter leaves 18. Each leaf 18 includes a sleeve-like connector 24 which is welded to the top of the leaf frame and positively connected by a bolt 26 to the bar 22. The bar 22 extends through a suitable seal mounted on the cover 15 and is coupled to a vibratory impactor 28 mounted on shock absorber means 30 to a platform 32 extending from the cover 15. The manner in which the impactor 28 is mounted and the bar 22 is sealed to the cover is described in detail in U.S. Pat. No. 3,212,643.

A plurality of cake-compression diaphragms 34 are mounted in pairs to the bar 22 and to the manifold 19 between the filter leaves 18 for automatic compression of the filter cakes which build up over the faces of the leaves. The manner in which diaphragms of this type may be mounted to the filter tank and the way in which they operate is more fully described in U.S. Pat. No. 3,708,072 which is incorporated herein by reference.

As best shown in FIGS. 2 and 3, each filter leaf 18 comprises a planar underdrain 35 of grid-like construction and a pair of perforate, screen-like members 36 respectively mounted against the opposite faces of the underdrain structure within a rigid, annular frame 38. The frame 38 and the underdrain or core 35 thus provide the support structure of the leaf. The frame 38 provides a continuous collection channel which opens at the bottom only into a tubular connector 39 which mounts the leaf to the outlet manifold 19 and carries the effluent from the cavity within the core of the leaf to the outlet passageway through the manifold 19. If desired, a perveous textile bag may enclose the entire leaf as is described, for example in U.S. Pat. No. 3,708,072, to provide the substrate on which the filter cake is deposited during a filtering operation.

In order to control the build-up of the filter cakes on the filter leaves and more particularly to prevent the cakes from extending over the peripheral edges thereof, each leaf is provided with a cake control member 40 which takes the form of a flexible resilient strip in the preferred embodiment of the invention described herein. The strip 40 thus provides a pair of flange portions 40A and 40B which extend laterally from the leaf in proximity to the outer edge thereof to confine the filter cakes to the spaces surrounded by the flange portions 40A and 40B. The members 40 may be flat rubber strips which take on the illustrated cross-sectional concave shapes when stretched around the leaves. These strips 40 may be mounted to the leaves in any suitable manner, but in the embodiment of the invention shown in FIGS. 2 and 3, the strip is removably attached to the leaf 18 by means of a plurality of spring clips 42. In addition, each strip is provided near its two ends with holes which are stretchfitted over the stud 24 and with an intermediate hole which fits over the connector 39 at the bottom. If desired, two or more separate strips may be used.

In the embodiment shown in FIG. 4 the spring clips 42 are plastic coated pieces 44 representing one type of clip and are rivetted to the strip 40, while in the embodiment of FIG. 5 the clips 42 are also formed of spring metal but are of a different construction. In both cases, the clips 42 permit the caps to be readily snapped onto and off the leaves. If desired, the caps may include an integral U-shaped channel which fits directly onto the frame of the leaf.

When the filter cakes have built up beyond the distal edges of the strip and into engagement with the diaphragms 34, the differential pressure across the diaphragms pushes the diaphragms toward the leaves. As the diaphragms thus move toward the leaves they engage the distal edges of the strips 40 and, as best shown in FIG. 4, curl the flange portions 40A and 40B inwardly toward the respective cakes. The seal which is effected when each diaphragm contacts its associated cap flange prevents any further cake build-up once compression has commenced. After the cakes have been dewatered by the diaphragm compression operation, the filter tank is drained while air of other gas under pressure is supplied to the tank to hold the diaphragms against the cakes until the tank has been drained of liquid. The pressure is then relieved to permit the diaphrams to retract away from the cakes which remain intact on the leaves. If desired, a leaching liquid or solvent can then be passed through the filter cakes, or the cakes can be immediately dislodged from the leaves by actuation of the vibratory impactor 28. The strips 40 are relatively thin and sufficiently flexible so that when the cakes are shaken from the leaves the lower portions of the strips 40 fold downwardly under the weights of the cakes to permit the cake material to drop away from the filter leaves.

In some applications where sluffing off of parts of the dried cakes from the leaves is not a problem, the strips 40 may extend over the upper portions only of the leaves. For example, the strips may cover only the upper 180° of the leaves inasmuch as peripheral cake build up on the lower portions of the leaves does not generally present a problem since the soft peripheral cake falls off of the lower portions of the leaves as the liquid is drained from the filter.

Referring to FIGS. 6 and 7, there is shown a portion of a conventional tubular filter element 50 having a perforate, cylindrical outer member surrounding a core or underdrain. The invention finds application with most any filter construction. The element 50 is closed at the bottom by a suitable end cap and is provided with a mounting and outlet tube 52 at the top which connects to the filtrate outlet of the associated filter. Filter tubes of this general type are described in U.S. Pat. Nos. 3,438,502 and 3,695,443. As shown in FIG. 6 a filter cake 54 builds up over the cylindrical outer surface of the filter element 50 as solids entrained in the filtrate are removed from the liquid passing into the filter element.

In accordance with the present invention, cake build-up over the top of the tube is prevented by means of a washer-like cap 56 which loosely fits over the outlet tube 52 and rests on the top of the filter tube. The cap 56, like the strip 40 shown in FIGS. 1-5, confines the space in which the cake can build up and prevents the deposition of the cake on the top surface of the filter element. The cap 56 may be rigid or flexible in this embodiment of the invention. A similar cap member 58 is mounted over a stud 60 which extends from the bottom of the filter element. The cap 58 is held in place by a snap ring 62. The cap 58 must be sufficiently flexible to fold down under the weight of the cake when the filter cake is dislodged from the filter element.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A filter leaf for use in a pressure filter of the type including cake compression diaphragm means disposed in spaced, coplanar relationship with one face of said leaf for movement against a filter cake deposited on said face during operation of said filter, comprising
   a generally planar support structure adapted to be mounted in an upright, vertical position in said filter,
   means mounted on said support structure for providing a vertically disposed perforate surface on which solids entrained in a liquid passed through said surface are deposited to form said filter cake over said surface, and
   elastomeric cake control means positioned across the top of said perforate surface and extending laterally therefrom for sealing engagement with said diaphragm means when said diaphragm means moves toward said perforate surface to compress said filter cake against said perforate surface.

2. A filter element according to claim 1 wherein said cake control means is also positioned below said perforate surface to stabilize said cake on said filter element.

3. A filter element according to claim 2 wherein
   the portion of said cake control means positioned below said perforate surface is formed of an elastomer which is sufficiently flexible to fold downwardly under the weight of said filter cake when said cake is released from said perforate surface thereby to permit said cake to fall from said element.

4. A filter element according to claim 1 wherein said cake control means comprises
   an elastomeric strip removably attached to said support structure.

5. A filter element according to claim 1 wherein said cake control means comprises
   a flat strip of resilient material stretched around at least the upper portion of said frame.

6. A filter element according to claim 5 wherein said strip is bowed in cross-section.

7. A filter element according to claim 6 wherein said strip comprises
   integral gripping means for removably attaching said strip to said frame.

8. In a pressure filter, the combination of
   a filter leaf having a cavity disposed between first and second planar, mutually parallel, perforate surfaces,
   first and second cake compression diaphragms respectively disposed in spaced parallel relationship with said perforate surfaces for movement toward said perforate surfaces to compress filter cakes deposited on said surfaces during the operation of said filter,
   cake control means extending laterally from said leaf in proximity to the periphery thereof to prevent said filter cake from building up over the periphery of said filter leaf,
   said cake control means comprising an elastomeric member which is spaced from said diaphragms during operation of said filter and is sealably engaged by said diaphragms when said diaphragms move toward said perforate surfaces to compress said filter cakes.

9. The combination according to claim 8 wherein
   said cake compression diaphragm means are dimensioned to sealably engage said cake control means while compressing the cakes on said filter element.

10. In a pressure filter, the combination comprising
    a filter leaf including a support structure having first and second mutually parallel, planar, vertically disposed perforate surfaces on opposite sides of a cavity in said leaf,
    elastomeric cake control means positioned across the top of said perforate surfaces and extending laterally therefrom,
    a pair of cake compression diaphragm means respectively disposed in spaced, coplanar relationship with said perforate surfaces and in spaced relationship with said cake control means and movable toward said surfaces against filter cakes deposited on said surfaces during the operation of said filter, and
    said diaphragm means sealably engaging said cake control means while moving toward said perforate surfaces and compressing said filter cakes against said perforate surfaces.

* * * * *